United States Patent [19]

Adams

[11] Patent Number: 4,478,429
[45] Date of Patent: Oct. 23, 1984

[54] COLLAPSIBLE CARRIER

[76] Inventor: John F. Adams, 65 Lanark Rd., Apt. #9, Brighton, Mass. 02135

[21] Appl. No.: 445,981

[22] Filed: Dec. 1, 1982

[51] Int. Cl.³ .............................................. B62B 1/04
[52] U.S. Cl. .................................. 280/655; 280/659; 280/47.29; 280/47.37 R
[58] Field of Search ............... 280/652, 655, 659, 654, 280/47.37 R, 47.29, 40, 651, 47.17, 47.24; 190/18 R, 18 A

[56] References Cited

U.S. PATENT DOCUMENTS 4,037,858  7/1977  Adams ................................ 280/652
4,431,211  2/1984  Carrigan ............................. 280/655

OTHER PUBLICATIONS

"Bag Toter" Advertising Brochure, Aparco, Inc.

*Primary Examiner*—David M. Mitchell
*Attorney, Agent, or Firm*—Joseph S. Iandiorio

[57] ABSTRACT

A collapsible carrier is provided, including: a telescopic handle; a plastic base which includes a transverse bar and two wheel brackets integrally formed with the base and disposed one proximate each end of the bar; and a slide bracket slidably mounted on the transverse bar and pivotably attached to one end of the handle. A latch releasably locks the slide bracket proximate the center of the transverse bar, and two flexible plastic legs with integral spacer washers are provided. One leg is pivotably mounted proximate each end of the bar for pivoting between the open and closed position with respect to the bar. Spacer washers are disposed between the legs and the bar to space the legs apart from the bar free from interference with the slide bracket when the legs are in a closed condition. Flexible links are interconnected between the handle and the transverse bar proximate the ends thereof.

26 Claims, 6 Drawing Figures

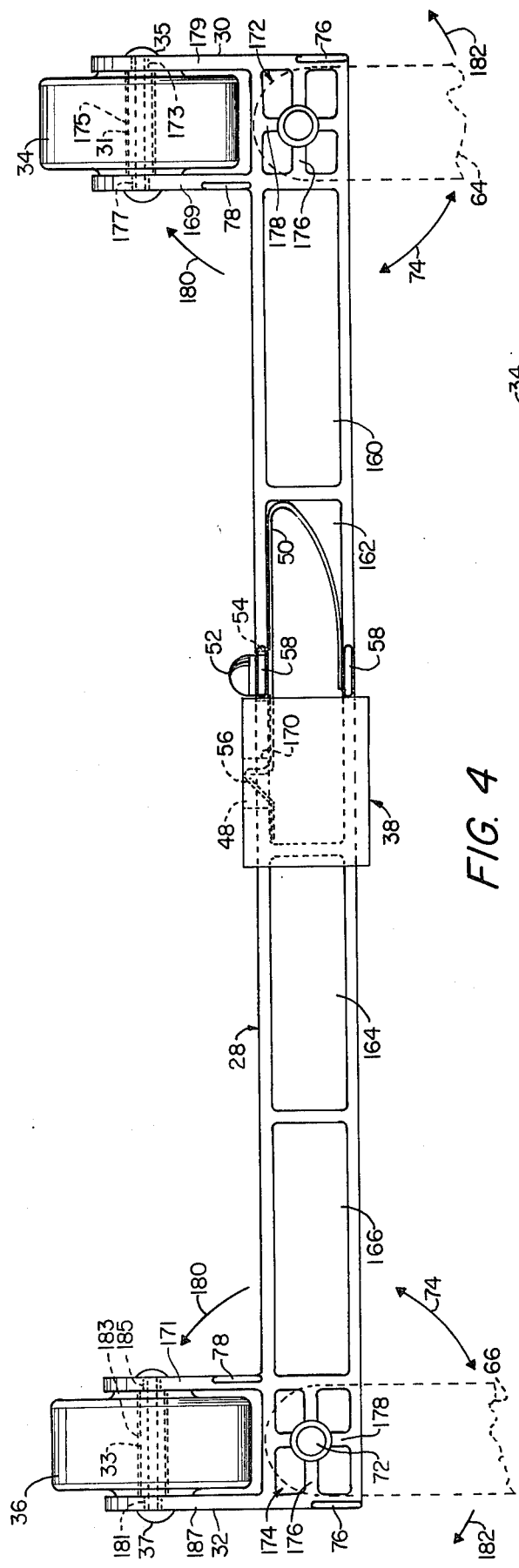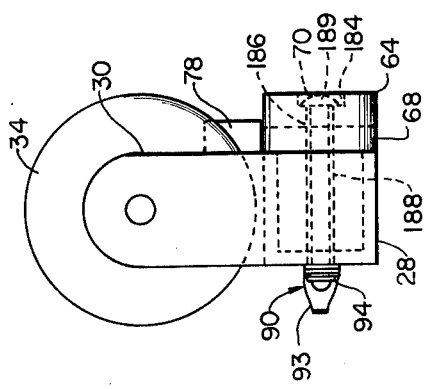
FIG. 4
FIG. 5

COLLAPSIBLE CARRIER

FIELD OF INVENTION

This invention relates to a collapsible carrier particularly suited for carrying luggage, groceries and other bulky or heavy items.

BACKGROUND OF INVENTION

Various carrier devices are presently utilized for transporting heavy or bulky items, such as luggage. The devices may be collapsible to enable convenient storage and transport of the carrier. Carriers are manufactured largely with a large number of metal parts which require machinery and must be fastened together. Considerable time and expense is involved in the manufacture of such devices. Further, the metal parts on carriers of the prior art contribute to scratching or marring of the luggage or other parcels being carried, as well as adding considerably to their weight.

One carrier includes a collapsible handle connected to a metallic transverse bar by means of a metallic slide bracket. A pair of wheels are mounted to the bar, one proximate each end, and a pair of metallic legs are pivotably connected to the bar, also with one proximate each end. A flexible chain is connected between the handle and each end of the transverse bar. This carrier may exhibit one or more types of binding, which can restrict its ability to collapse. For example, the metal slide bracket may bind with the metal transverse bar over which it slides. Also, occasional lubrication may thus be required to enable binding-free operation.

Also, opposite sides of the bracket, sandwiched about the bar, may be squeezed together, thereby hindering folding or collapsing of the carrier. Binding may also be caused by rotation of the chain elements. The lowermost link piece of each chain, which is typically attached to the transverse bar by a rivet or similar fastener, may rotate relative to the fastener. Or the adjacent link piece attached to the lowermost piece may be twisted relative to the lowermost piece. Such twisting and turning of the link pieces tends to snag or jam the entire chain and prevents easy folding of the handle with respect to the transverse bar.

The foldable metal legs lack a degree of flexibility and may be permanently bent or broken by heavy items. Further, the collapsible handle of the carrier may exhibit a tendency of collapsing too easily. In order to remedy this a tight interference fit has been provided between the lower end of one handle section and the upper end of the adjacent handle section. This tight interference fit is effected when the adjacent handle sections are extended relative to each other. However, such a tight fit tends to restrict the ability of the upper handle section to rotate relative to the lower section. Maneuverability of the carrier is thus hindered.

SUMMARY OF INVENTION

It is therefore an object of this invention to provide an improved collapsible carrier which is manufactured with less complex and fewer parts than carriers of the prior art, thereby reducing the time and expense of manufacture.

It is a further object of this invention to provide a collapsible carrier which employs lighter and more durable parts than utilized by carriers of the prior art.

It is a further object of this invention to provide a collapsible carrier which reduces jamming and binding of carrier parts, thereby enhancing collapsibility.

It is a further object of this invention to provide a collapsible carrier which is self-lubricating, thereby eliminating the need for periodic operator lubrication.

It is a further object of this invention to provide a collapsible carrier which prevents unintended collapse of the handle while maintaining carrier maneuverability.

It is a further object of this invention to provide a collapsible carrier which securely holds items to be carried while reducing marring and scratching of such items.

It is a further object of this invention to provide a collapsible carrier which may be employed for carrying luggage, groceries and a wide variety of other items and which is readily collapsible to enable convenient transport and storage.

This invention features a collapsible carrier including a telescopic handle. A plastic base is provided including a transverse bar and two wheel brackets integrally formed with the base and disposed one proximate each end of the bar. A slide bracket is slidably mounted on the transverse bar and pivotably attached to one end of the handle. Latching means are provided for releasably locking the slide bracket proximate the center of the transverse bar. Two flexible plastic legs with integral spacer washers are provided, one pivotably mounted proximate each end of the bar for pivoting between an open and closed position with respect to the bar. The spacer washers are disposed between the legs and the bar to space the legs apart from the bar, free from interference with the slide bracket when the legs are in a closed condition. Flexible link means are interconnected between the handle and the transverse bar proximate the ends thereof.

In a preferred embodiment, the handle includes a bottom section with a reduced neck at its upper end, an intermediate section slidably mounted in the bottom section and having at its lower end stop means for preventing extension of the lower end of the intermediate section beyond the reduced neck of the bottom section. The intermediate section has a reduced neck at its upper end. There is a top section slidably mounted in the intermediate section and having at its lower end stop means for preventing extension of the lower end of the top section beyond the reduced neck of the intermediate section. Spring-biased detent means may be provided for preventing return of the top section into the intermediate section. Spring-biased detent means may also be provided for preventing return of the intermediate section into the bottom section.

The plastic base may include a self-lubricating plastic. The slide bracket may also be plastic and may be a self-lubricating plastic. The legs may be formed of a flexible plastic.

The latching means may include a hole in the slide bracket and a spring-biased element in the bar for engaging the hole when the bracket is in the center position. The slide bracket may include a base plate which slides on the bottom surface of the bar and two spaced wall plates which extend upwardly on either side of the bar and which receive and pivotably mount the lower end of the bottom section of the handle. The slide bracket may include a pin on either side of the lower end of the bottom section interconnected between the wall plates and bushing means on the pins for maintaining a predetermined separation between the wall plates. The bar is captured between the two bushings and the base plate.

The flexible link means may include chain. A collar may be disposed on the reduced neck of the bottom section, and first and second link elements may be interconnected between the collar and either end of the bar. The bar may include a pin at each end thereof proximate the link means for engaging the link means and preventing rotation thereof. The chain may include a plurality of link pieces, the lowermost piece being attached to the bar and flattened to restrict rotation of the adjacent link piece with respect thereto.

The bar may include two stops proximate each end thereof for confining the associated leg to a pivotal range of ninety degrees between positions aligned with and transverse to the bar. Stop means may also be included for defining the position of one side of the slide bracket in the center latched position and for spacing the adjacent leg from the bar in the area of the slide bracket. The stops and/or the stop means may be integral with the bar.

The top section of the handle may be rotatable in the intermediate section and the intermediate section may be rotatable in the bottom section.

The carrier may further include flexible strap means interconnected between the flexible legs proximate the distal ends of the legs. The strap means may be elastic and may be attached to the bottom surfaces of the legs.

DISCLOSURE OF PREFERRED EMBODIMENT

Other objects, features and advantages will occur from the following description of a preferred embodiment and the accompanying drawings, in which:

FIG. 4 is a bottom elevational view of the carrier illustrating opened legs in phantom for clarity;

FIG. 5 is an elevational side view of the base, an attached wheel and a leg and integral washer in the closed position.

Figure 1:
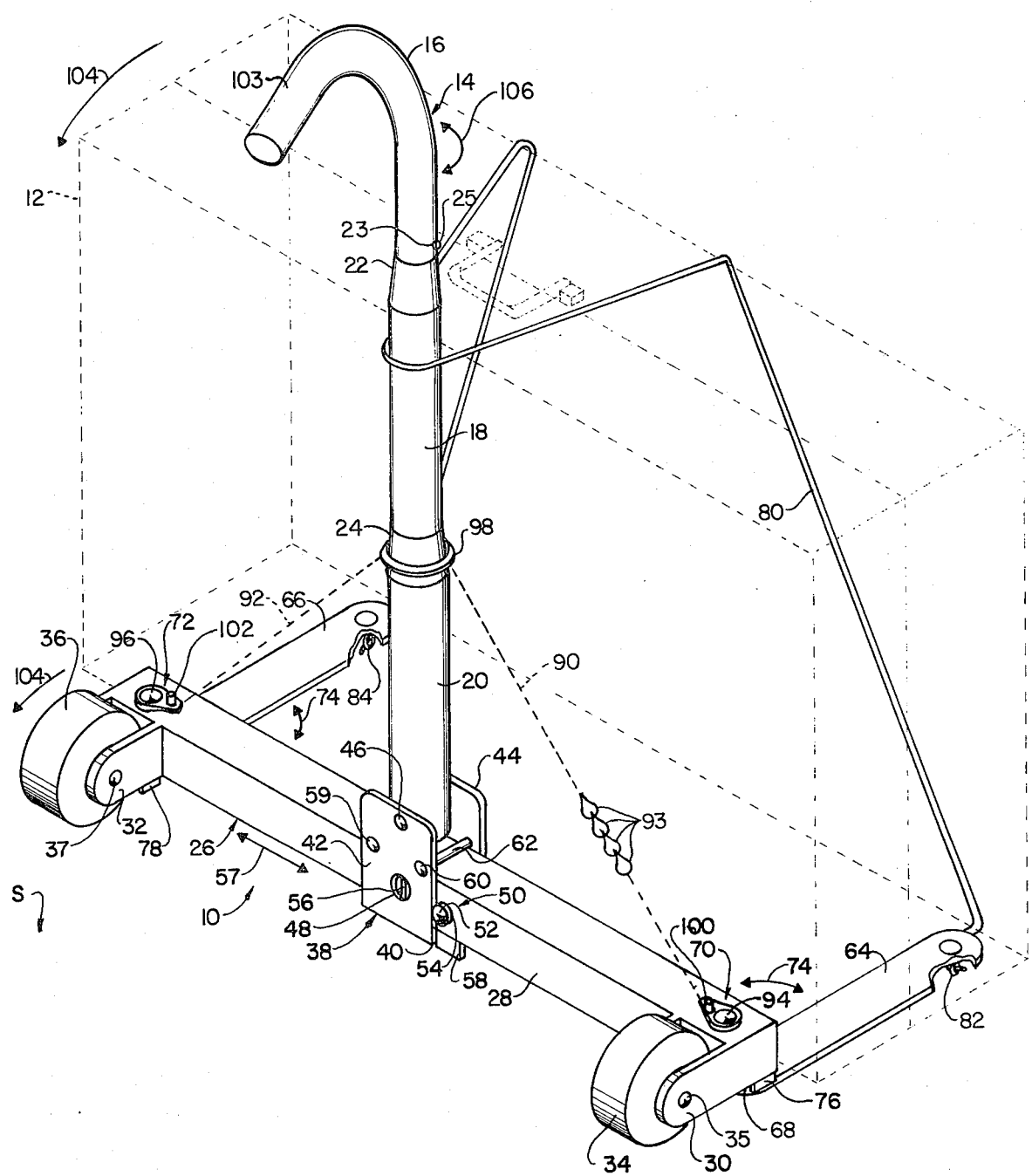
FIG. 1 is an axonometric view of a collapsible carrier according to this invention in an open condition carrying a suitcase.

A collapsible carrier according to this invention may be effected using a telescopic handle. Such a handle typically includes a bottom section with a reduced, e.g. swaged, neck at its upper end and an intermediate section slidably mounted in the bottom section and having at its lower end stop means for preventing extension of the lower end of the intermediate section beyond the reduced neck of the bottom section. The intermediate section has a reduced neck at its upper end and a top handle section is slidably mounted in the intermediate section, having at its lower end stop means for preventing extension of the lower end of the top section beyond the reduced neck of the intermediate section. Typically, the handle sections are composed of a metal alloy and are tubular in shape. The stop means may include swivels which extend through the handle sections and which interfere with the reduced necks of the adjacent handle sections to limit extension. Preferably, the top section is rotatable in the intermediate section and additionally the intermediate section may be rotatable in the bottom section. Typically, to enable such rotation a collar having a partially beveled channel at each end is provided about the handle section to be rotated, and a roller pin is substituted for the stop means rivet through that section. Such a roller pin is permitted to roll around the unbeveled portion of the tube wall end of the collar, while a snap button is automatically depressed as it passes through the beveled portions of the collar at either end of the collar, thereby enabling rotation of the handle section while preventing extension of the lower end of that section beyond the reduced neck of the section therebelow. A snap button or spring-biased detent means is typically provided on the top handle section for preventing return of that section into the intermediate section, and such spring-biased detent means may also be provided to prevent return of the intermediate section into the bottom handle section.

A plastic base is provided which includes a transverse bar and two wheel brackets integrally formed with the base and disposed one proximate each end of the bar. The plastic base is preferably a self-lubricating plastic. A slide bracket which is typically also composed of a self-lubricating plastic is slidably mounted on the transverse bar and pivotably attached to one end of the handle, preferably at the lowermost end of the bottom handle section. The slide bracket may include a base plate which slides on the bottom surface of the bar and two spaced wall plates which extend upwardly on either side of the bar and which receive and pivotably mount the lower end of the bottom handle section. The slide bracket preferably includes a pin on either side of the lower end of the bottom section interconnected between the wall plates, and bushing means are provided on the pins for maintaining a predetermined separation between the wall plates. Accordingly, binding of the slide bracket against the transverse bar is eliminated.

Latching means are provided for releasably locking the slide bracket proximate the center of the transverse bar. Such latching means typically include a hole in the slide bracket and a spring-biased element in the bar for engaging the hole when the bracket is in the center position.

Further provided are two flexible plastic legs, typically composed of self-lubricating plastic, with integral spacer washers. One such leg is pivotably mounted proximate each end of the transverse bar for pivoting between an open and closed condition with respect to the bar. The spacer washers are disposed between the legs and the bar to space the legs apart from the bar free from interference with the slide bracket when the legs are in a closed condition. All the plastic parts may be made of Delrin or glass reinforced nylon. Flexible strap means such as an elastic cord may be interconnected between the flexible legs proximate the distal ends of the legs. It is preferred that such strap means be attached to the bottom surfaces of the flexible legs. Such a strap may be stretched to conform with the size and shape of the item being carried.

It is preferred that the transverse bar include two stops proximate each end thereof for confining the associated leg to a pivotal range of ninety degrees between positions aligned with and transverse to the bar. Such stops are typically integral with the transverse bar, thereby reducing parts and manufacturing requirements. Stop means may also be provided for defining the position of one side of the slide bracket in the center latched position and for spacing the adjacent leg from the bar in the area of the slide bracket. These stop means are also typically made integral with the transverse bar.

Flexible link means are interconnected between the handle, typically the bottom section thereof, and the transverse bar proximate the ends of the bar. Such flexible link means preferably include a chain and a collar disposed at the reduced neck of the bottom handle section. Instead of chains, a cable may be used. Further, such a cable may be crimped at each end to the base and run through a hole in the handle with stops on the cable to prevent its movement through the hole. First and second link means are typically interconnected between the collar and either end of the transverse bar. The collar is preferably composed of plastic to reduce scratching and marring of luggage or other items being carried. The transverse bar may include a pin, which may be integral with the bar, at each end thereof proximate the link means for engaging the link means and preventing rotation thereof. The link means may include a plurality of link pieces, each typically including a flat piece of sheet metal which includes a pair of holes and is folded so that the holes cooperate. The pieces are interconnected, typically in the form of common chain such as is used in a variety of doors, windows and other applications. The lowermost link piece may be attached to the bar and flattened along the fold thereof to restrict rotation of the adjacent piece with respect to the lowermost piece. Prevention of rotation of the link means in the above manners reduces jamming and binding.

The carrier of this invention exhibits a number of important advantages. The use of integral plastic parts greatly reduces the weight of the carrier from that of metal carriers and reduces the parts required and the machining steps necessary for producing the apparatus. Approximately forty less parts are used by the present invention than by carriers of the prior art. Manufacturing time is also greatly reduced, from approximately two hours, required to manufacture present carriers, to approximately seven minutes needed for producing the present invention. Jamming of chains and binding of metal contact points is also greatly reduced by the present invention. Use of plastic in the legs and base permits temporary elastic flexibility of the unit in the case of accidental misuse, threby eliminating permanent deformations of the legs and/or leg-bar joints, which would otherwise occur should the unit be used without the elastic strap being engaged over the objects carried. This designed-in elasticity greatly enhances the workability and reliability of the unit under usual conditions of use. The carrier is sturdy, maneuverable, and readily collapsible, thereby enabling its convenient storage and transport. It is particularly appropriate for carrying luggage, groceries, and a wide variety of other parcels and items. Items may be carried securely and without scratching or marring.

There is shown in FIG. 1 a carrier apparatus 10 according to this invention for accommodating a suitcase 12. A telescopic handle 14 includes a top section 16, an intermediate section 18, and a bottom section 20. Intermediate section 18 includes a reduced neck 22, and bottom section 20 includes a reduced neck 24 which assist in limiting extension of the handle sections in a manner more fully described in FIG. 2. A spring-biased detent 25 protrudes out of hole 23 in top section 16, thereby preventing return of the top section 16 into intermediate section 18. Operation of detent 25 is also described in greater detail in FIG. 2.

A plastic base 26 includes a transverse bar 28 and integral wheel brackets 30 and 32. Wheels 34 and 36 are rotatably mounted to wheel brackets 30, 32 by axial pins 35, 37, respectively. Internal axle bushings cover these pins 31, 33 and keep the bracket walls apart, FIG. 4. Wheels 34, 36 enable rolling of the carrier 10 along surface S.

Slide bracket 38 includes a base plate 40 which slides on the bottom surface of transverse bar 28 and two spaced wall plates 42, 44, which extend upwardly on either side of bar 28. A pivot 46 extends between wall plates 42 and 44 and extends through an unpictured hole in bottom section 20 of handle 14. In this manner, handle 14 is pivotably attached to slide bracket 38. Latching means are provided for releasably locking slide bracket 38 proximate the center of bar 28. Such latching means include a hole 48 in wall plate 42, and a spring-biased element 50 which is mounted within bar 28, in a manner more fully described hereinafter. Element 50 includes a button 52 which resiliently protrudes through a hole 54 in bar 28 and a latch element 56 which engages bracket hole 48 when bracket 38 is in the illustrated center position and button 52 is biased to protrude through hole 54. Bracket 38 is released by depressing button 54. This causes latch element 56 to be withdrawn from bracket hole 48. Slide bracket 38 is thus enabled to slide back and forth in the direction of double-headed arrow 57 between wheel bracket 32 and stop means 58, which is integrally connected to the bottom of bar 28 and thus defines the position of one side of bracket 38 in the center latched position.

Pins 59 and 60, typically comprising rivets, are mounted between wall plates 42 and 44 of bracket 38. A bushing 62 is mounted on each pin 59, 60 between plates 42 and 44 for maintaining a predetermined separation between the wall plates. Bushings 62 (note that the bushing on pin 59 is obscured) thereby prevent squeezing together of wall plates 42 and 44 and binding of bracket 38 on transverse bar 28.

A pair of flexible plastic legs 64, 66 with integral spacer washers 68 (only the washer for leg 66 is shown) are pivotably attached by pivots 70, 72 respectively, proximate the ends of transverse bar 28. Legs 64, 66 are thus enabled to pivot in the direction of double-headed arrows 74. A pair of stops 76, 78 which are integral with transverse bar 28 are provided at each end of the bar 28 for limiting the leg at that end of the bar to a pivotal range of ninety degrees between positions aligned with and, as shown in FIG. 1, transverse to the bar. In particular, stop 76 (shown only for leg 66) limits opening of the legs to the transverse position, and stop 78 (shown only for leg 64) limits closing of the legs to a position aligned with transverse bar 28.

An elastic strap 80 is attached in a manner more fully shown hereinafter to the bottom surfaces of legs 64 and 66. Note the knots 82, 84 at each end of strap 80 which denote such attachment.

A pair of link elements 90, 92, which comprise chain including individual link pieces 93, are interconnected respectively between the enlarged ends 94, 96 of rivets 70, 72, at opposite ends of transverse bar 28, and a collar 98 which is disposed about the reduced neck 24 of bottom handle section 20. A pin 100, 102, which is integral with transverse bar 28, extends through a hole in the lowermost link piece 93 of link elements 90, 92, respectively. Such pins 100, 102 limit rotation of the lowermost link piece 93 with respect to rivets 70, 72 to which it is attached, thereby reducing jamming of the chains.

A suitcase 12 is placed on carrier 10 and thereby supported by legs 64 and 66, bracket 38, base 26, handle 14 and link elements 90, 92. Collar 98 is made of plastic, to reduce marring and scratching of suitcase 12. Carrier 10 may stand upright resting upon wheels 34, 36 and the distal ends of legs 64, 66. To transport suitcase 12, the hooked end 103 of top handle section 16 is grasped and the carrier is pivoted forward on wheels 34, 36 in the direction of arrow 104. Handle 14 is enabled to rotate in a manner described in FIG. 2 in the direction of double-headed arrows 106 so that maneuverability of carrier 10 is enhanced. Handle 14 is pulled so that carrier 10 rolls along surface S on wheels 34, 36. Suitcase 12 may thus be transported to a desired destination.

Figure 2:
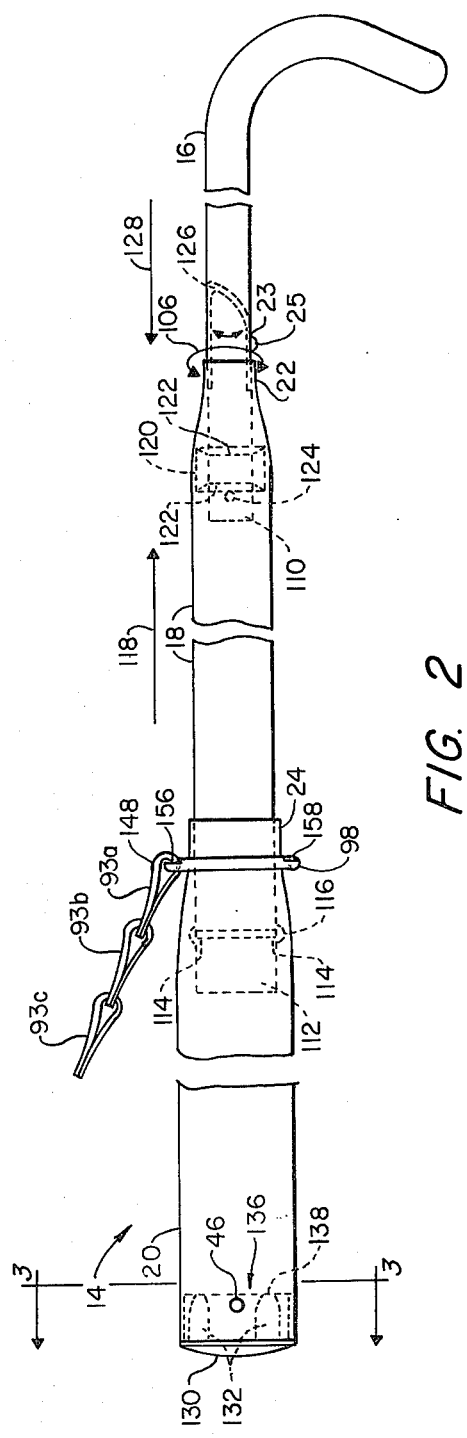
FIG. 2 is a plan view of a telescopic handle used in the carrier of this invention in an open condition.

Telescopic handle 14 is illustrated with a collar 98 and several pieces 93 of a link element 90 attached thereto, in FIG. 2. Lower end 110 of tubular top handle section 16 fits within tubular intermediate section 18 and the lower end 112 of section 18 fits within tubular bottom section 20. Intermediate section 18 includes a pair of cooperating holes 114 in the wall thereof, which accommodate rivet 116. Only a single hole 114 is needed if a pop-rivet is used. Rivet 116 is longer than the diameter of reduced neck 24. Therefore, when handle 14 is extended into the open condition in the direction of arrow 118, rivet 116 interferes with reduced neck 24 and prevents removal of the intermediate section 18 from bottom section 20.

Such a manner of attachment may restrict rotatability of intermediate section 18 with respect to bottom section 20. Therefore, to enable the rotability of top section 16 in the direction of arrow 106, the following manner of attachment is provided: a collar 120 is fitted about that part of handle section 16 which is received within intermediate handle section 18. A through channel of the collar includes beveled surfaces 122 at either end. A roller pin 124 is mounted to top section 16 and typically extends transversely therethrough. When top section 16 is extended in the direction of arrow 118, pin 124 engages the collar and pin 124 prevents removal of top section 16 from collar 120. The collar itself is held within intermediate section 18 by reduced neck 22 of section 18. The reduced neck has a smaller diameter than collar 120. It should be noted that such a means for enabling rotation of a handle section similarly may be provided at the lower end of intermediate section 18 to allow for its rotation relative to bottom section 20.

Spring-biased detent 25 prevents unintended collapsing of top handle section 16 into intermediate section 18. Detent 25 is an integral part of a spring 126 which is biased into an open condition. When section 16 is withdrawn from section 18 in the direction of arrow 118, spring 126 therefore biases detent 25 to protrude out of hole 23 in section 16 which is revealed when section 16 is withdrawn from section 18. When section 16 is urged into a collapsed condition in the direction of arrow 128, detent 25 interferes with the edge of the opening of reduced neck 22 of intermediate section 18, thereby preventing return of top section 16 into intermediate section 18. To permit such return, the detent is depressed within the obscured hole, thereby closing spring 126, and section 16 is pushed into section 18. When pulling handle 16 out or pushing handle 16 in, spring button 25 rides up the beveled edges 122 of either end of collar 120. Although not shown, similar spring-biased detent means may be provided for preventing the return of intermediate section 18 into bottom section 20.

An end cap 130 is plugged into the lower end of bottom section 20. Cap 130 includes a plurality of springy circumferential members 132. Members 132 provide a cap diameter which is normally greater than the bore 134 of bottom section 20. Members 132 bend into a reduced diameter condition to fit within bore 134 as cap 130 is inserted into the lower end of bottom section 20. Resilient members 132 thereby bear against the inner wall of bottom section 20 to ensure a secure fit of cap 130 onto bottom section 20.

Figure 3:
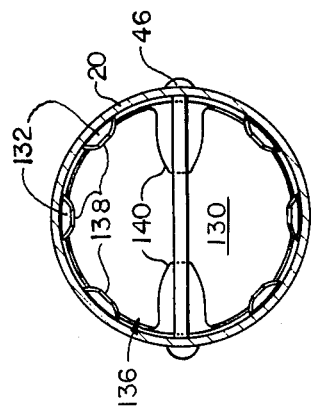
FIG. 3 is a cross sectional view of the telescopic handle showing the end cap and taken along line 3—3 of FIG. 2.

Handle 14 may be collapsed in the direction of arrow 128: top section 16 fits within intermediate section 18, and intermediate section 18 fits within bottom section 20. The inner end 136 of cap 130 includes a plurality of inwardly facing prongs 138, FIG. 3. Two of those prongs are bent inwardly, as indicated at 140, so that rivet 46, FIG. 2, may be accommodated by cap 130.

Collar 98, FIG. 2, is disposed about reduced neck 24 of bottom section 20. Several individual link pieces 93a, b, c of link element 90 are illustrated extending from collar 98. Note that link element 92 is omitted for clarity, as is the remaining portion of link element 90. The bent narrow section 148 of uppermost link piece 93a is fitted within a notch 156 in collar 98. Note the second notch 158 for the second omitted link element.

Tranverse bar 28, FIG. 4, includes a molded plastic piece having a plurality of recesses 160, 162, 164 and 166 on the bottom surface thereof. Latching spring 50 is disposed in recess 162 and is biased open so that button portion 52 thereof and latching element 56 thereof extend through holes 54 and 170, respectively, in bar 28. When bracket 38 is in the center position, as shown, hole 48 thereof cooperates with hole 170 in transverse bar 28, and thus latching element 56 engages hole 48. Stop means 58 define the center position of bracket 38. Transverse bar 28 includes a pair of recessed areas 172, 174, proximate each end thereof. Each of the recessed areas includes a crossbar section 176, 178, disposed therein. At the center of each crossbar is an obscured hole for accommodating pivots 70, 72, respectively. These pivots pivotably attach legs 64 and 66 to transverse bar 28.

Stops 78 are mounted on inner arms 169, 171 of wheel brackets 30, 32, respectively. When legs 64 and 66 are in the closed condition, e.g. aligned with bar 28, stops 78 prevent pivoting of legs 64, 66 toward the wheel brackets, e.g. in the direction of arrows 180. Stops 76 are integrally connected to the bottom of bar 28 at each end thereof. Stops 76 limit pivoting of legs 64, 66 to a position transverse to bar 28. Legs 64, 66 thus may not pivot beyond stops 76 in the direction of arrows 182. Accordingly, stops 76 and 78 restricts the legs to pivoting between an open and closed condition in the direction of double-headed arrow 74, aligned with and transverse to bar 28.

Wheels 34, 36 are mounted to wheel brackets 30, 32 by axial pins 35 and 37 respectively. In particular, pin 35 extends through cooperating holes 173, 175 and 177 of bracket arm 179, wheel 134 and bracket 169, respectively, and pin 37 extends through cooperating holes 181, 183 and 185 of bracket arm 187, wheel 36 and bracket arm 171, respectively. Each of the pins 35, 37 is enlarged at both ends to retain it in place.

The manner of attaching both the integral leg and washer and the link elements to the transverse bar 28 is shown in FIG. 5. Leg 64 includes a recess 184 and a hole 186 at the bottom of recess 172. Hole 186 communicates with a hole 188 in crossbar 176 of transverse bar 28. A pivot is fitted into the communciating holes 186 and 188 so that the head 189 of pivot 70 fits within recess 174 and the bottom end of pivot 70 extends above the top surface of bar 28. Pivot 70 is typically a rivet, and the bottom enlarged end 94 of pivot 70 secures pivot 70 in place.

The lowermost link piece 93 of link element 90 is connected to pivot 70 and is interposed with a washer 101 between the enlarged bottom 94 of pivot 70 and bar 28. Washer 101 is disposed betrween enlarged end 94 and link 93. By disposing the head of pivot 70 at the bottom of leg 64, and the bottom enlarged end 94 of pivot 70 at the top of bar 28, and then securing link element 90 between bottom end 94 and bar 28, enhanced strength is provided over carriers of the prior art, wherein the head of the rivet holds the lowermost link piece. Stop element 78 is disclosed as attached to wheel bracket 30; however, stop 76 has been omitted for clarity.

Figure 6:
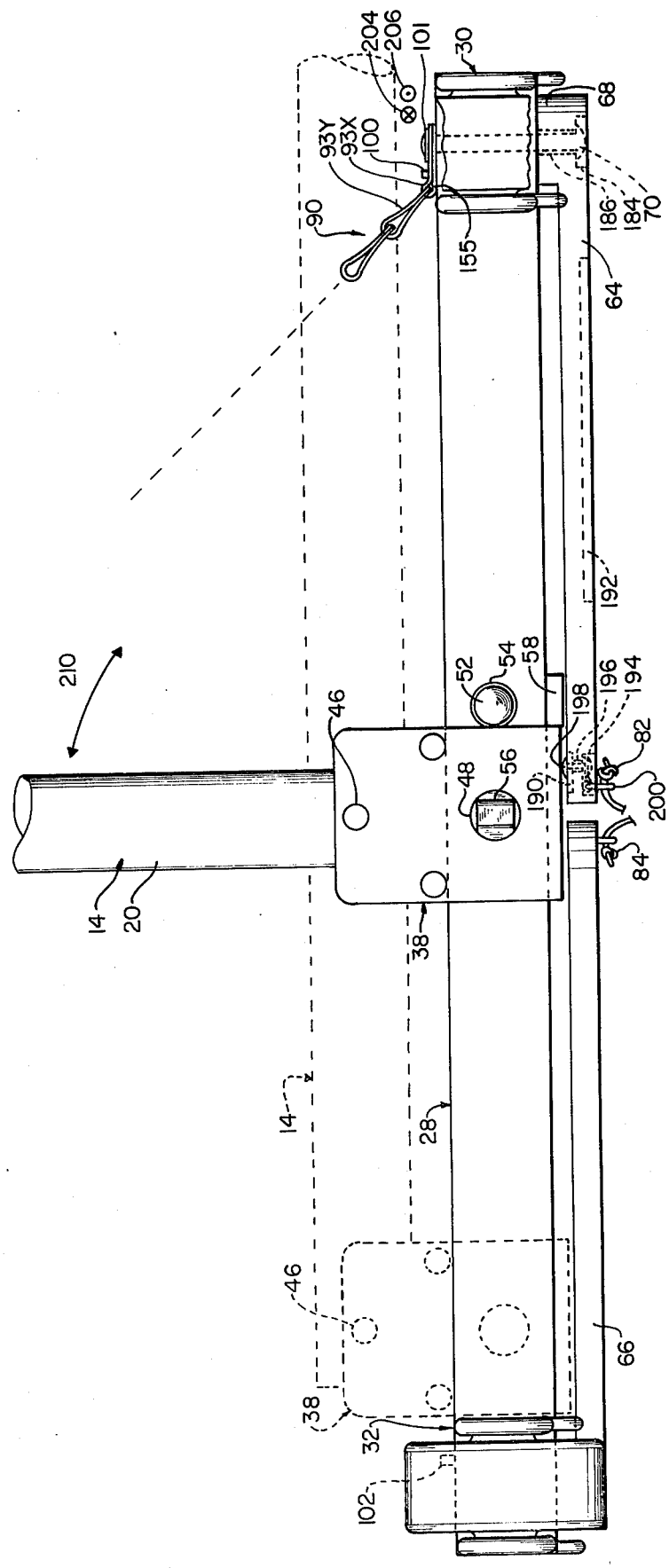
FIG. 6 is an elevational simplified and partly cut away view of the collapsible carrier in a partially open condition, further illustrating, in phantom, the carrier in a collapsed condition.

Legs 64, 66 are illustrated in a closed position in FIG. 6. Integral washers 68, 70, space legs 64, 68 respectively from slide bracket 38 so that the legs do not interfere with bracket 38 when the legs are in the closed position. Legs 64, 66 are manufactured of molded plastic and includes lower recess 192. The following discussion is presented for leg 64 only but applies equally to leg 66.

Leg 64 includes a recess 184 and a hole 186 at the pivotably attached end thereof for accommodating pivot 70, and includes a lower recess 194 and upper recess 190 proximate the distal end thereof. A hole 196 extends from the bottom of recess 194 to the top of recess 190 of leg 64. A rivet 198 is attached to leg 64 and extends through hole 196 such that the head of rivet 198 is disposed at the top of the leg and the flared bottom of rivet 198 is disposed within recess 194. A metal loop 200 is attached to the bottom of rivet 198. One end of strap 80 is drawn through loop 200 and tied in a knot 82 such that strap 80 is secured to the bottom of leg 64. The other end of strap 80 is similarly attached to the bottom of leg 66. In this manner a suitcase or other item is allowed to sit on the top of opened legs 64 and 66, as shown in FIG. 1, without interference from the knots 82, 84 of strap 80. Strap 80 may be extended any required amount to wrap around the item and secure that item to carrier 10.

As shown in FIG. 6, the lowermost link piece 93x is attached with a washer 101 to the lower enlarged end 94 of pivot 70 at the top of transverse bar 28. Pivot 70 extends through the cooperating holes of lowermost link piece 93x, and the enlarged end 94 holds link element 90 and washer 101 to the top of transverse bar 28.

Pin element 100, which is integral with transverse bar 28, extends through cooperating holes of the lowermost link piece 93x. Accordingly, rotation of the lowermost link element in the direction of arrows 204, 206 is restricted, and jamming of the link element 90 is prevented. A similar pin 102 prevents jamming of the unpictured link element attached to the other side of bar 28.

The loop portion 155 of lowermost link piece 93x is flattened so that the adjoining link piece 93y may not rotate horizontally with respect to the lowermost link piece 93x but may rotate vertically. This feature also reduces jamming of link element 90.

Stop means 58, which are integrally attached to bar 28, define the center position of slide bracket 38 when bracket 38 is in a latched condition, e.g. when latch element 56 engages hole 48 of slide bracket 38. Stop means 58 prevents slide bracket 38 from sliding further to the right in FIG. 6. Stop means 58 also spaces leg 64 from slide bracket 38. Due to integral washers 68 and stop means 58, the slide bracket remains free from interference from legs 64, 66, regardless of whether the legs are open or closed.

Carrier 10 is collapsed for transportion or storage in the following manner: Telescopic handle 14 is closed as described in FIG. 2. Button 52 of latching spring 50 is depressed within hole 54. Latching element 56 is consequently withdrawn from slide bracket hole 48 into transverse bar 28. Slide bracket 38 is slid to the left in FIG. 6. Link element 92 (omitted in FIG. 6) becomes slack and link element 90 is drawn taut. Handle 14 is pivoted about pivot 46 in the direction of arrow 210 so that link element 90 is slackened. Slide bracket 38 is thus allowed to slide until it engages wheel bracket 32, and handle 14 folds until it maintains a position substantially parallel with transverse bar 28. As handle 14 is folded, link element 92 becomes more taut and link element 90 becomes slack. Both link elements have been omitted in the closed condition for clarity. To open the carrier 10 for use, the above steps are simply reversed: handle 14 is pivoted upwardly into a position perpendicular with bar 28 and slide bracket 38 is slid to the right until it engages stop means 58 and latch element 56 engages bracket hole 48. The legs 64, 66 may then be opened to accommodate an item to be carried.

Other embodiments will occur to those skilled in the art and are within the following claims:

What is claimed is:

1. A collapsible carrier comprising:
   a telescopic handle;
   a plastic base including a transverse bar and two wheel brackets integrally formed with said base and disposed one proximate each end of said bar;
   a slide bracket slidably mounted on said transverse bar and pivotably attached to one end of said handle;
   latching means for releasably locking said slide bracket proximate the center of said transverse bar;
   two flexible plastic legs with integral spacer washers, one pivotably mounted proximate each end of said bar for pivoting between an open and closed condition with respect to said bar, said spacer washers being disposed between said legs and said bar to space said legs apart from said bar free from interference with said slide bracket when said legs are in a closed condition; and
   flexible link means interconnected between said handle and said transverse bar proximate the ends thereof.

2. The carrier of claim 1 in which said handle includes a bottom section with a reduced neck at the upper end, an intermediate section slidably mounted in said bottom section and having at its lower end stop means for preventing extension of the lower end of said intermediate section beyond said reduced neck of said bottom section, said intermediate section having a reduced neck at its upper end and a top section slidably mounted in said intermediate section, and having at its lower end stop means for preventing extension of the lower end of said top section beyond said reduced neck of said intermediate section.

3. The carrier of claim 2 further including spring-biased detent means for preventing return of said top section into said intermediate section.

4. The carrier of claim 2 further including spring-biased detent means for preventing return of said intermediate section into said bottom section.

5. The carrier of claim 1 in which said plastic base is a self-lubricating plastic.

6. The carrier of claim 1 in which said slide bracket is plastic.

7. The carrier of claim 6 in which said slide bracket is self-lubricating plastic.

8. The carrier of claim 1 in which said legs are formed of self-lubricating plastic.

9. The carrier of claim 1 in which said latching means includes a hole in said slide bracket and a spring-biased element in said bar for engaging said hole when said bracket is in the center position.

10. The carrier of claim 2 in which said slide bracket includes a base plate which slides on the bottom surface of said bar and two spaced wall plates which extend upwardly on either side of the bar and which receive and pivotably mount the lower end of said bottom section.

11. The carrier of claim 10 in which said slide bracket includes a pin on either side of the lower end of said bottom section interconnected between said wall plates, and bushing means on said pins for maintaining a predetermined separation between said wall plates.

12. The carrier of claim 1 in which said flexible link means includes chain.

13. The carrier of claim 1 in which said flexible link means includes a collar disposed on said reduced neck of said bottom section, and first and second link elements being interconnected between said collar and either of said bars.

14. The carrier of claim 1 in which said bar includes a pin at each end of said bar proximate said link means for engaging said link means and preventing rotation thereof.

15. The carrier of claim 1 in which said bar includes two stops proximate each end for limiting the associated leg to a pivotal range of ninety degrees between positions aligned with and transverse to said bar.

16. The carrier of claim 1 in which said bar includes stop means for defining the position of one side of said slide bracket in the center latched position and for spacing the adjacent leg from said bar in the area of said slide bracket.

17. The carrier of claim 15 in which said stops are integral with said bar.

18. The carrier of claim 16 in which said stop means are integral with said bar.

19. The carrier of claim 2 in which said top section is rotatable in said intermediate section.

20. The carrier of claim 2 in which said intermediate section is rotatable in said bottom section.

21. The carrier of claim 12 in which each said chain includes a plurality of interconnected link pieces, the lowermost piece being attached to said bar and flattened to restrict rotation of the adjacent piece with respect thereto.

22. The carrier of claim 1 further including flexible strap means interconnected between said flexible legs proximate the distal ends of said legs.

23. The carrier of claim 22 in which said strap means is elastic.

24. The carrier of claim 22 in which said strap means is attached to the bottoms of said legs.

25. The carrier of claim 14 in which each said pin is integral with said bar.

26. A collapsible carrier comprising:
a telescopic handle having a bottom section with a reduced neck at the upper end, an intermediate section slidably mounted in said bottom section and having at its lower end a stop means for preventing extension of the lower end of said intermediate section beyond said reduced neck of said bottom section; said intermediate section having a reduced neck at its upper end; and a top section slidably mounted in said intermediate section and having at its lower end stop means for preventing extension of the lower end of said top section beyond said reduced neck of said intermediate sections and spring-biased detent means for preventing return of said top section into said intermediate section;
a plastic base including a transverse bar and two wheel brackets integrally formed with said base and disposed one proximate each end of said bar;
a slide bracket slidably mounted on said transverse bar and pivotably attached to one end of said bottom section;
latching means for releasably locking said slide bracket proximate the center of said transverse bar;
two flexible plastic legs with integral spacer washers, one pivotably mounted proximate each end of said bar for pivoting between an open and closed condition with respect to said bar, said spacer washers being disposed between said legs and said bar to space said legs apart from said bar free from interference with said slide bracket when said legs are in a closed condition; and
flexible link means interconnected between said bottom section and said transverse bar proximate the ends of said bar.

* * * * *